US010438514B2

(12) United States Patent
Jones et al.

(10) Patent No.: US 10,438,514 B2

(45) Date of Patent: Oct. 8, 2019

(54) IDENTIFICATION BAND

(71) Applicant: SATO HOLDINGS KABUSHIKI KAISHA, Tokyo (JP)

(72) Inventors: Christopher Jones, Alsip, IL (US); Ed Kmet, Riverside, IL (US); Kerry Ludden, Romeoville, IL (US); Andre Cote, Williamstown, NJ (US)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 15/424,073

(22) Filed: Feb. 3, 2017

(65) Prior Publication Data

US 2018/0225996 A1 Aug. 9, 2018

(51) Int. Cl.
*G06F 3/00* (2006.01)
*G09F 3/00* (2006.01)

(52) U.S. Cl.
CPC ............ *G09F 3/005* (2013.01); *G09F 3/0297* (2013.01)

(58) Field of Classification Search
CPC ........................................................ G09F 3/005
USPC ........................................ 40/633; 63/3.2, 5.1
See application file for complete search history.

(56) References Cited

U.S. PATENT DOCUMENTS 7,948,383 B2 * 5/2011 Lamp .................... G06K 19/04 340/10.52
2005/0108912 A1 5/2005 Bekker
2006/0202829 A1 * 9/2006 Girvin .............. G06K 19/07381 340/572.3
2006/0248767 A1 * 11/2006 Hofer ...................... A61L 15/46 40/633
2011/0314866 A1 * 12/2011 Niikura .................... A44C 9/02 63/3.2
2012/0062368 A1 3/2012 Graells Ferrandez et al.
2013/0049349 A1 * 2/2013 Feder ................ G06K 19/0776 283/75

FOREIGN PATENT DOCUMENTS

JP 2015-230502 A 12/2015
JP 2015-230503 A 12/2015

* cited by examiner

*Primary Examiner* — Joanne Silbermann
(74) *Attorney, Agent, or Firm* — Foley & Lardner LLP

(57) ABSTRACT

An identification band includes a strip of material including a first elongated strip portion at one end thereof, a second elongated strip portion at an other end thereof, and a transponder supporting portion provided therebetween. A transponder is provided in the transponder supporting portion. The first elongated strip portion is sized and configured to be secured completely around an object to be identified via at least one fastener in the first elongated strip portion, thereby defining a first loop around the object. The second elongated strip portion is sized and configured to be secured via the at least one fastener in the second elongated strip portion. The first elongated strip portion, the transponder supporting portion, and the second elongated strip portion together define a second loop at least partly around the object. An air gap exists between the transponder supporting portion and an outer surface of the first loop.

20 Claims, 11 Drawing Sheets

IDENTIFICATION BAND

BACKGROUND

The present disclosure relates generally to the area of identification bands. More particularly, the present disclosure relates to an identification band including a transponder having data and a monitoring system configured to read the data of the transponder to identify an object.

Identification bands may be used in applications such as hospital patient admissions, or customer/patron identification. Such identification bands typically include an elongated tape or band having a securing device such as an adhesive portion proximate one end thereof. The identification bands may include a transponder. Data may be read from and/or written to the transponder. The transponder may be, for example, a Radio Frequency Identification (RFID) device. With regard to conventional identification bands including RFID devices, in order to be read, the transponder needs to be placed directly in front of an RFID reader, at a near field distance of 2 to 3 inches (5.08 to 7.62 centimeters).

A need exists for improved technology including an identification band having a transponder that can be read at a larger distance between the transponder and the transponder reader.

SUMMARY

In one embodiment, an identification band includes a strip of material including a first elongated strip portion at one end of the strip, a second elongated strip portion at an other end of the strip, and a transponder supporting portion provided between the first elongated strip portion and the second elongated strip portion. A transponder is provided in the transponder supporting portion. The first elongated strip portion is sized and configured to be secured completely around an object to be identified via at least one fastener such that the first elongated strip portion defines a first loop around the object. The second elongated strip portion is sized and configured to be secured via the at least one fastener such that the first elongated strip portion, the transponder supporting portion, and the second elongated strip portion together define a second loop at least partly around the object. A diameter of the second loop is greater than a diameter of the first loop such that an air gap exists between the transponder supporting portion and an outer surface of the first loop.

In an additional embodiment, an identification band comprising a strip of material including a first elongated strip portion at one end of the strip, a second elongated strip portion at an other end of the strip, and a transponder supporting portion provided between the first elongated strip portion and the second elongated strip portion; a transponder provided in the transponder supporting portion; and at least one fastener is provided. A method of applying the identification band includes securing the first elongated strip portion completely around an object to be identified via the at least one fastener such that the first elongated strip portion defines a first loop around the object, and securing the second elongated strip portion around the object to the first elongated strip portion via the at least one fastener such that the first elongated strip portion, the transponder supporting portion, and the second elongated strip portion together define a second loop at least partly around the object. A diameter of the second loop is greater than a diameter of the first loop such that an air gap exists between the transponder supporting portion and an outer surface of the first loop.

In another embodiment, an identification band includes a strip of material including a first elongated strip portion at one end of the strip, a second elongated strip portion at an other end of the strip, and a transponder supporting portion provided between the first elongated strip portion and the second elongated strip portion. A transponder is provided in the transponder supporting portion, a first fastener is provided in the first elongated strip portion, and a second fastener is provided in the second elongated strip portion. The first elongated strip portion is sized and configured to be secured completely around an object to be identified via the first fastener such that the first elongated strip portion defines a first loop around the object. The second elongated strip portion is sized and configured to be secured via the second fastener such that the first elongated strip portion, the transponder supporting portion, and the second elongated strip portion together define a second loop at least partly around the object. A diameter of the second loop is greater than a diameter of the first loop such that an air gap exists between the transponder supporting portion and an outer surface of the first loop.

In yet another embodiment, an identification band comprising a strip of material including a first elongated strip portion at one end of the strip, a second elongated strip portion at an other end of the strip, and a transponder supporting portion provided between the first elongated strip portion and the second elongated strip portion; a transponder provided in the transponder supporting portion; a first fastener provided in the first elongated strip portion; and a second fastener provided in the second elongated strip portion is provided. A method of applying the identification band includes securing the first elongated strip portion completely around an object to be identified via the first fastener such that the first elongated strip portion defines a first loop around the object, and securing the second elongated strip portion around the object to the first elongated strip portion via the second fastener such that the first elongated strip portion, the transponder supporting portion, and the second elongated strip portion together define a second loop at least partly around the object. A diameter of the second loop is greater than a diameter of the first loop such that an air gap exists between the transponder supporting portion and an outer surface of the first loop.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring, in general, to the figures, an identification band 100 is configured to be secured around an object to be identified. The identification band 100 may be, for example, a bracelet, an anklet, or any other type of band configured to be secured around an object to be identified. The object to be identified may include an inanimate object or a living object such as a human or an animal. The identification band 100 may be wrapped around an appendage of the human or animal, for example, an arm, a wrist, or an ankle, but may alternatively be wrapped around any other portion of the human or animal's body (if possible based on the length of the identification band).

Figure 1:
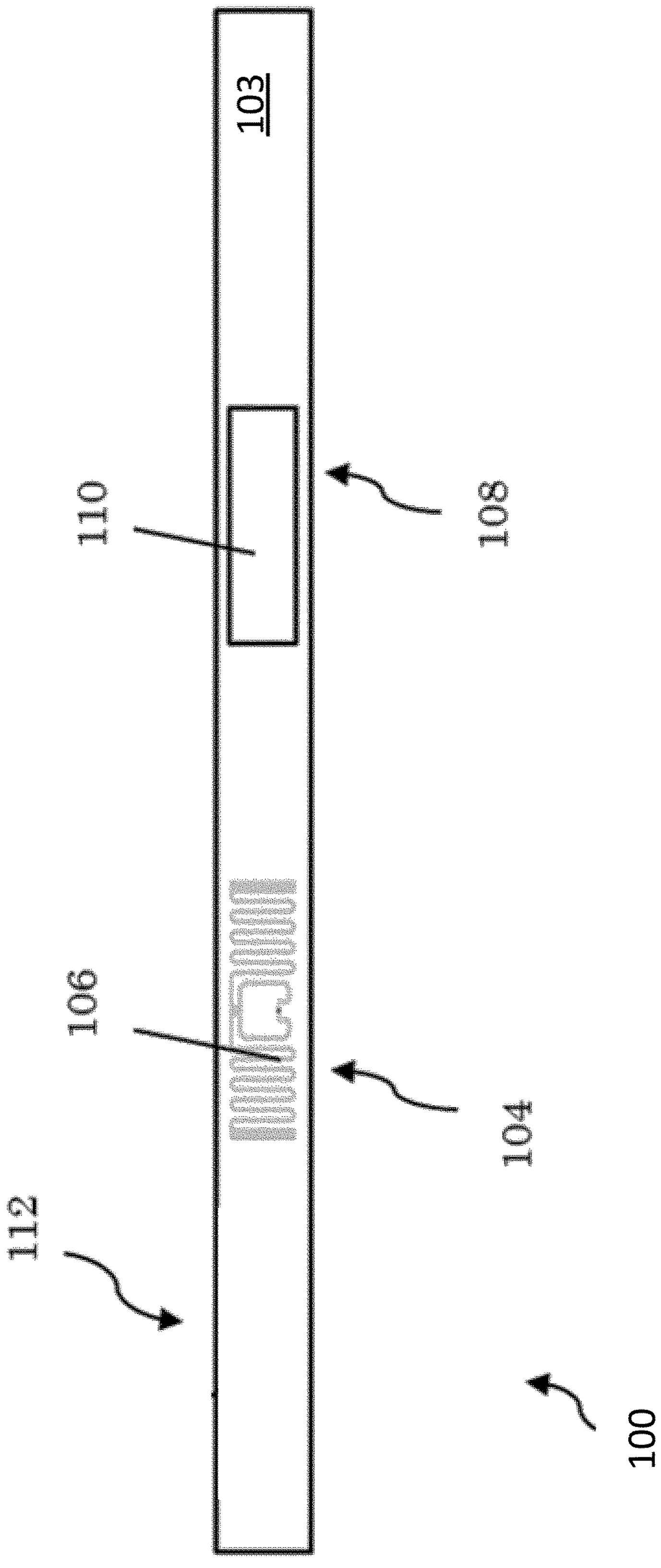
FIG. 1 illustrates an identification band including a transponder configured to communicate with a transceiver such that data may be read from and/or written to the transponder to identify an object to which the identification band is secured. The identification band includes one and only one fastener.
Figure 4:
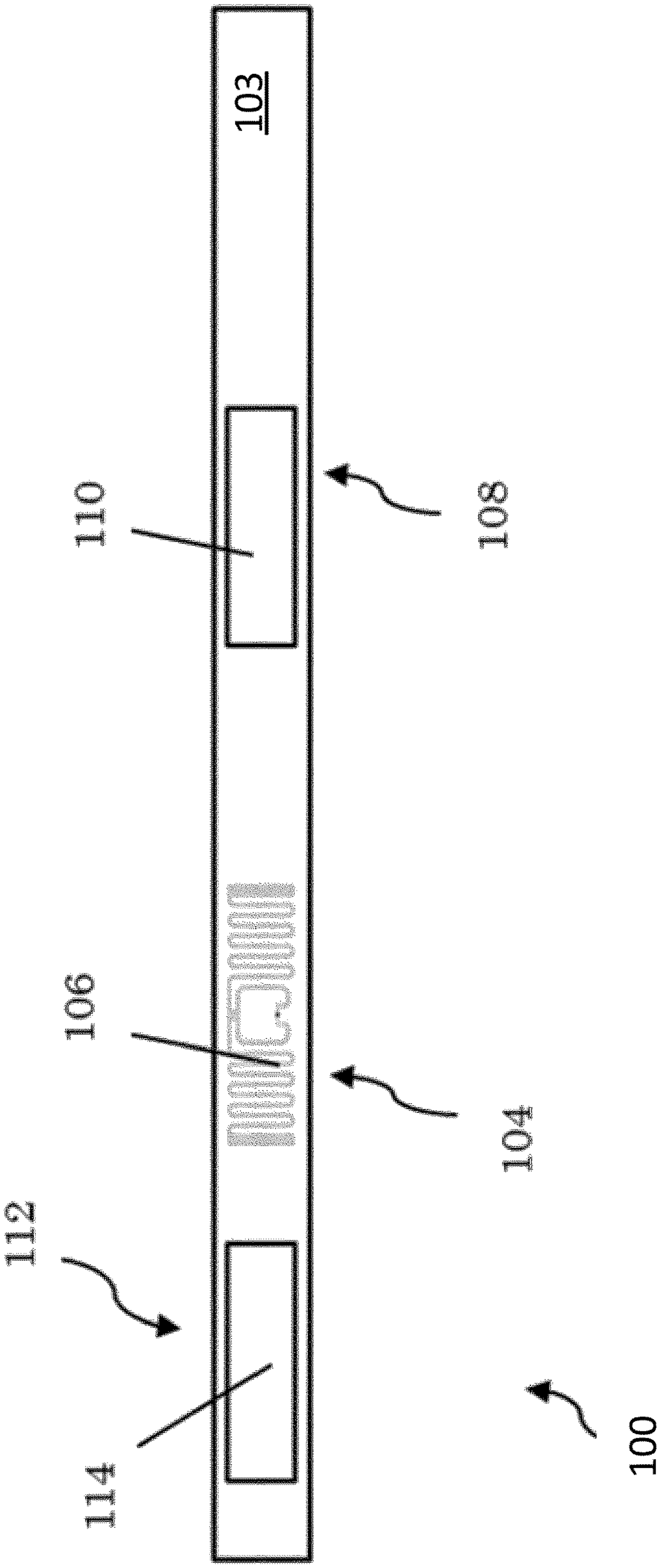
FIG. 4 illustrates an identification band including a transponder configured to communicate with a transceiver such that data may be read from and/or written to the transponder to identify an object to which the identification band is secured. The identification band includes a first fastener and a second fastener.

Referring to FIGS. 1 and 4, the identification band 100 includes a strip of material 103 including a first elongated strip portion 108 at one end of the strip 103, a second elongated strip portion 112 at the other (opposite) end of the strip 103, and a transponder supporting portion 104 provided between the first elongated strip portion 108 and the second elongated strip portion 112. The strip of material 103 may be made, for example, of plastic, paper, film, or combinations thereof. In some implementations, the strip of material 103 may be made of any material provided that an external surface of the strip of material 103 can be printed upon by a printer, for example, a direct thermal printer, a thermal transfer printer, or other printer using other printing technologies such as inkjet, dot-matrix, or electro-photographic. For example, the strip of material may be made of a thermal imprintable material, such that a direct thermal printer or a thermal transfer printer is capable of printing upon an external surface of the strip of material 103. In the example of FIG. 4, the strip of material 103 is rectangular having parallel side edges and parallel end edges. However, in other examples, the strip of material 103 may be formed in any other shape, for example, an elongated ovular shape.

Figure 12:
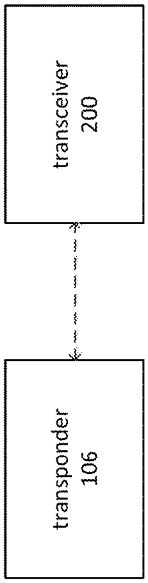
FIG. 12 illustrates communication between the transponder of the identification band of FIG. 4 and the transceiver.
Figure 13:
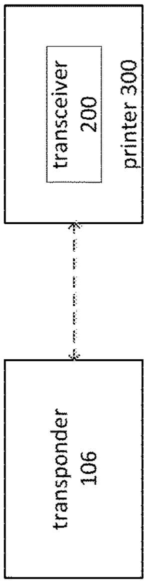
FIG. 13 illustrates communication between the transponder of the identification band of FIG. 4 and the transceiver, where the transceiver is provided within a printer.
Figure 14:
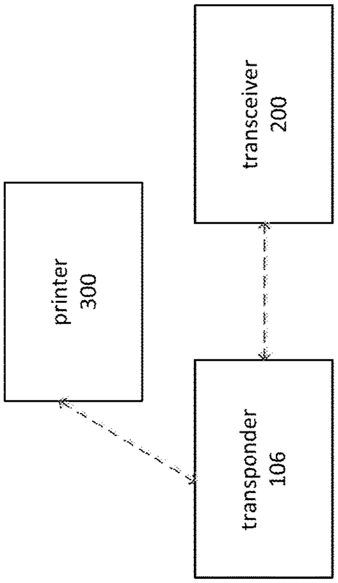
FIG. 14 illustrates communication between the transponder of the identification band of FIG. 4 and the transceiver, and communication between the transponder and a printer, where the printer and the transceiver are provided at a distance from one another.

The transponder supporting portion 104 includes a transponder 106 supported thereon. The transponder 106 may be mounted on a surface of the strip of material 103 in the transponder supporting portion 104, or embedded within the strip of material 103 in the transponder supporting portion 104. The transponder 106 is configured to communicate with a transceiver 200 such that data may be read from and/or written to the transponder 106. See FIGS. 12-14. The transponder 106 may be used with any type of RFID interrogation device (such as a spatially selective RFID device). Frequencies of operation for the transponder include (but are not limited to) 13.56 MHz (HF) and UHF protocols.

The first elongated strip portion 108 is located at a first end of the strip of material 103, and a second elongated strip portion 112 is located at a second end of the strip of material 103. See FIGS. 1 and 4. In FIG. 1, one and only one fastener 110 is provided in the first elongated strip portion 108. The first elongated strip portion 108 is sized and configured to be secured completely around an object to be identified via the one and only one fastener 110 such that the first elongated strip portion 108 defines a first loop A around the object. See FIG. 2. The first loop A includes an inner surface facing an outer surface of the object to be identified. The second elongated strip portion 112 is sized and configured to be secured to the first elongated strip portion 108 by the one and only one fastener 110 to define a second loop. A diameter of the second loop B is greater than a diameter of the first loop A such that an air gap 120 exists between the transponder supporting portion 104 and an outer surface of first loop A.

In FIG. 4, a first fastener 110 is provided in the first elongated strip portion 108 and a second fastener 114 is provided in the second elongated strip portion 112. The first elongated strip portion 108 is sized and configured to be secured completely around an object to be identified via the first fastener 110 such that the first elongated strip portion 108 defines a first loop A around the object. See FIG. 5. The first loop A includes an inner surface facing an outer surface of the object to be identified. The second elongated strip portion 112 is sized and configured to be secured via the second fastener 114 such that the first elongated strip portion 108, the transponder supporting portion 104, and the second elongated strip portion 112 together define a second loop B at least partly around the object. See FIG. 5. The second elongated strip portion is sized and configured to be secured to the first elongated strip portion by a second securing device to define a second loop. A diameter of the second loop B is greater than a diameter of the first loop A such that an air gap 120 exists between the transponder supporting portion 104 and an outer surface of first loop A.

Figure 2:
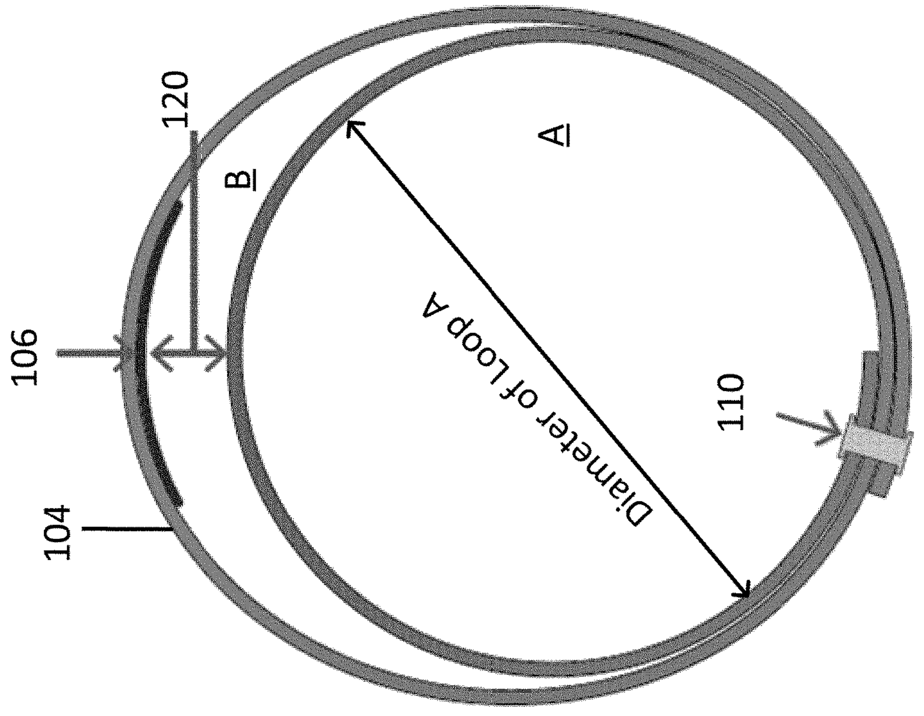
FIG. 2 illustrates an example of the identification band of FIG. 1, where a first loop and a second loop are formed by securing portions of the identification band with the one and only one fastener.
Figure 5:
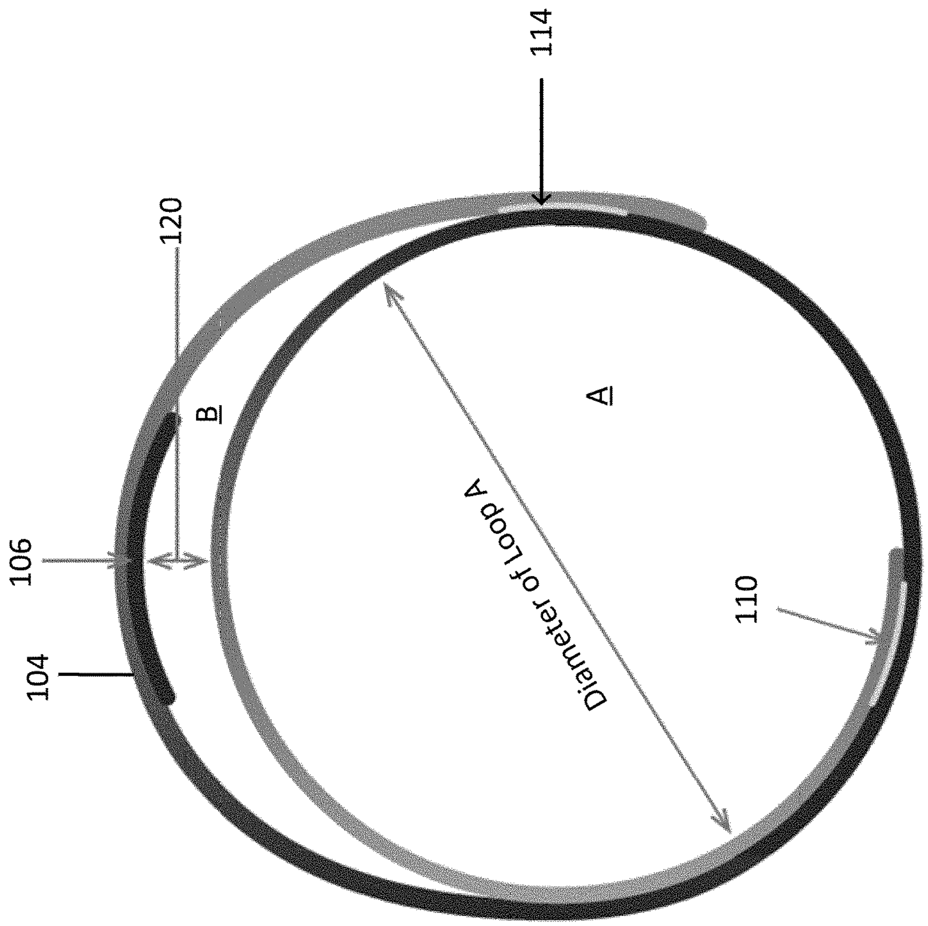
FIG. 5 illustrates an example of the identification band of FIG. 4, where a first loop and a second loop are formed by securing portions of the identification band with a first adhesive layer and a second adhesive layer.

Referring to each of FIGS. 2 and 5, in an example in which the object is a human and the identification band 100 is secured around a human's wrist, a diameter of the first loop A may be from 2.5 to 3.5 inches (6.35 to 8.89 cm). A maximum distance between the first loop A and the second loop B (i.e., a maximum distance of the air gap 120) may be from 0.25 to 1 inch (0.635 to 2.54 cm). A minimum distance between the first loop A and the second loop B (i.e., a minimum distance of the air gap 120) may be ⅛ inch (0.3175 cm). Even with the addition of the second loop B, the identification band 100 remains close to the object to be identified and does not include loose or dangling parts.

By utilizing both the first loop A and the second loop B, when the identification band 100 is secured to an object to be identified, the transponder 106 is located at a predetermined distance from the object. For example, when the object is a human or an animal, the separation between the body and the transponder 106 (i.e., the air gap 120) attenuates a natural interference caused by proximity/contact with the object. Thus, the read distance of the transponder 106 by a monitoring system including the transceiver 200 can be increased, for example, up to 2000% (e.g., up to five feet or 1.524 meters), when compared to conventional identification bands that only use a single loop.

In some examples, the one and only one fastener 110, or the first fastener 110/second fastener 114 are reversibly and removably secured to the strip of material 103. In other examples, the one and only one fastener 110, or the first fastener 110/second fastener 114 are permanently secured to the strip of material 103. The one and only one fastener 110, or the first fastener 110/second fastener 114 may be provided as a separated piece from the strip of material 103, or integrally formed into a single piece with the strip of material 103.

In general, a method of applying the identification band 100 includes a first step of securing the first elongated strip portion 108 completely around an object to be identified via at least one fastener such that the first elongated strip portion 108 defines the first loop A around the object. The method further includes a second step of securing the second elongated strip portion 112 around the object to the first elongated strip portion 108 via the at least one fastener such that the first elongated strip portion 108, the transponder supporting portion 104, and the second elongated strip portion 112 together define the second loop B at least partly around the object.

In some examples, at least one of the first fastener 110 and the second fastener 114 is an adhesive layer. In other examples, such as the example of FIG. 6, both the first fastener 110 and the second fastener 114 are adhesive layers. The adhesive layer may include an adhesive backing material to prevent the first fastener 110 and/or the second fastener 114 from adhering to surfaces prior to the identification band 100 being secured to the object to be identified. The adhesive backing material may be removed when the first fastener 110 and/or the second fastener 114 is to be secured to a surface of the strip of material 103.

Figure 6:
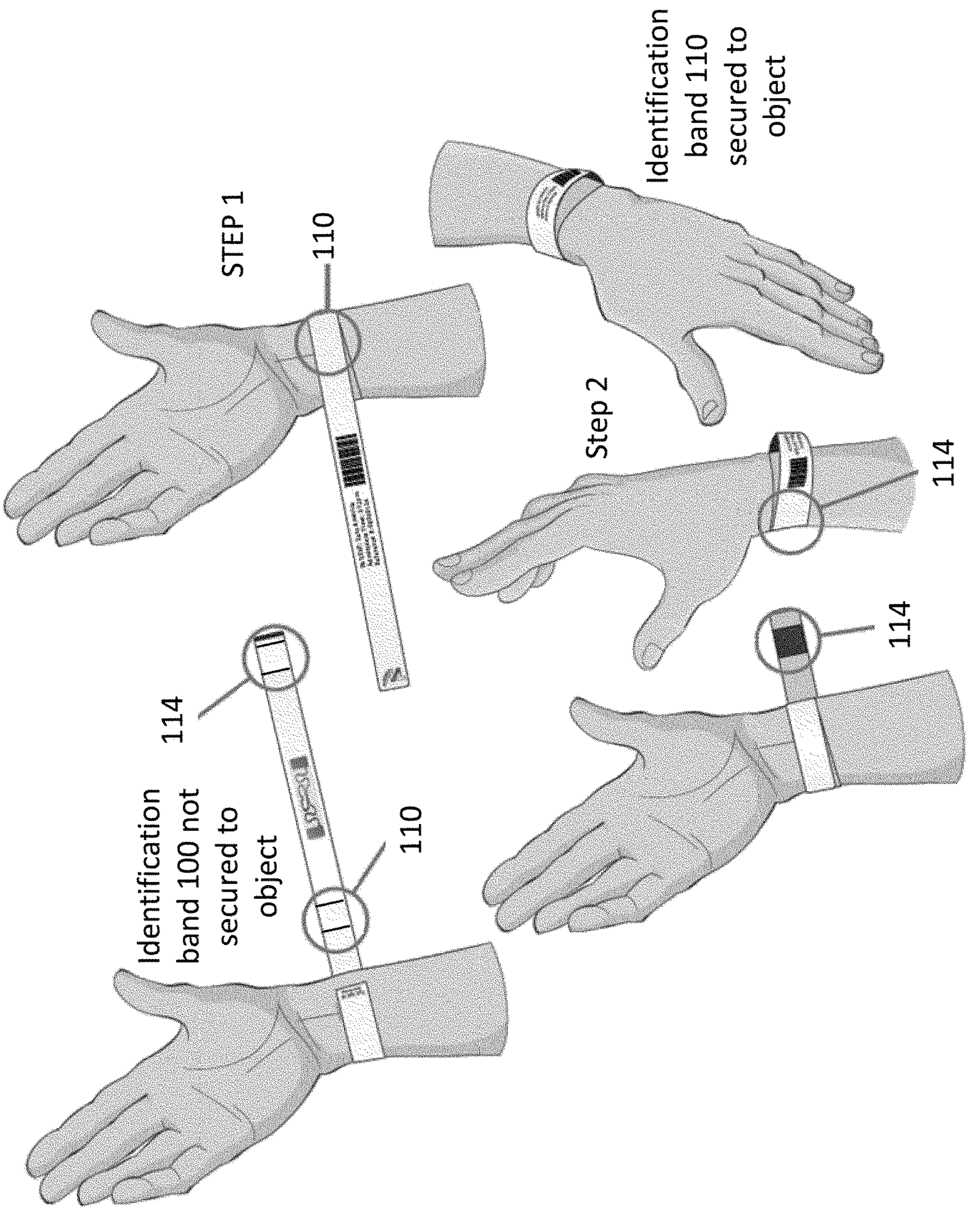
FIG. 6 illustrates the steps for securing the identification band of FIG. 5 to the object to be identified.

As illustrated in FIG. 6, in Step 1, the identification band 110 is applied by securing the first elongated strip portion 108 completely around an object to be identified (e.g., a human wrist) via the first fastener 110 (i.e., an adhesive layer with any adhesive backing material removed) such that the first elongated strip portion 108 defines the first loop A around the object. In Step 2, the second elongated strip portion 112 is secured around the object to the first elongated strip portion 108 via the second fastener 114 (i.e., an adhesive layer with any adhesive backing material removed) such that the first elongated strip portion 108, the transponder supporting portion 104, and the second elongated strip portion 112 together define the second loop B at least partly around the object. A diameter of the second loop B is greater than a diameter of the first loop A such that an air gap 120 exists between the transponder supporting portion 104 and an outer surface of the first loop A. See FIG. 5.

Figure 9:
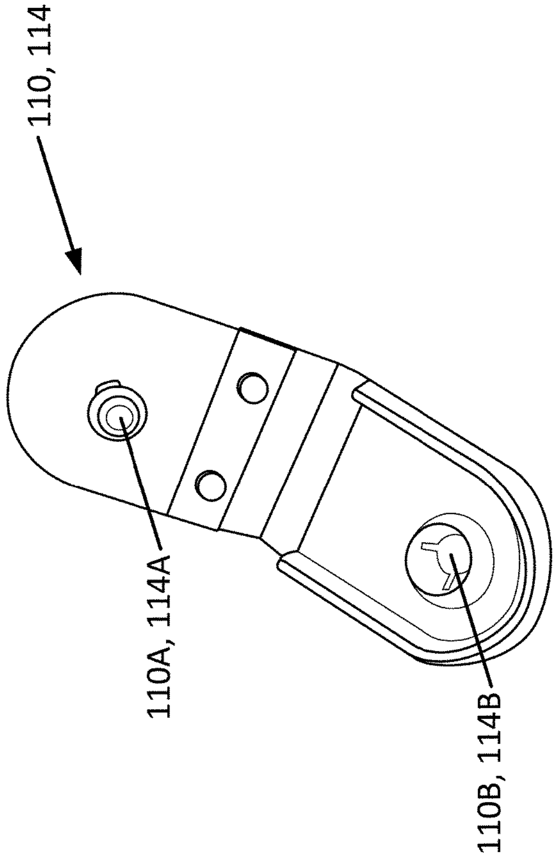
FIG. 9 illustrates an example of the first and second snap fastener of FIG. 7.

In other examples, one or both of the first fastener 110 and the second fastener 114 is a snap fastener, as illustrated in FIG. 9. The snap fastener (i.e., the one and only one fastener 110 of FIG. 1 or the first fastener 110 and/or second fastener 114 of FIG. 4) includes a male portion 110A, 114A (e.g., a securing pin) configured to be inserted at one side of the strip of material 103 in a respective one of a pin receiver 116 in the first elongated strip portion 108 and/or a pin receiver 118 in the second elongated strip portion 112, and received at the other side of the strip of material 103 by a female portion 110B, 114B. The male portion 110A, 114A of the snap fastener is held in place within the female portion 110B, 114B of the snap fastener until a predetermined pressure is applied to remove the male portion 110A, 114A from the female portion 110B, 114B. As illustrated in FIG. 9, the male portion 110A, 114A may be provided at a first end (e.g., a proximal end) of a fastening material and the female portion 110B, 114B may be provided at a second end (e.g., a distal end) of the fastening material. In other examples, the male portion 110A, 114A and the female portion 110B, 114B may be separate, individual pieces configured to mate. The at least one pin receiver 116 and the at least one pin receiver 118 may be, for example, an aperture or hole in the strip of material 103.

Figure 3:
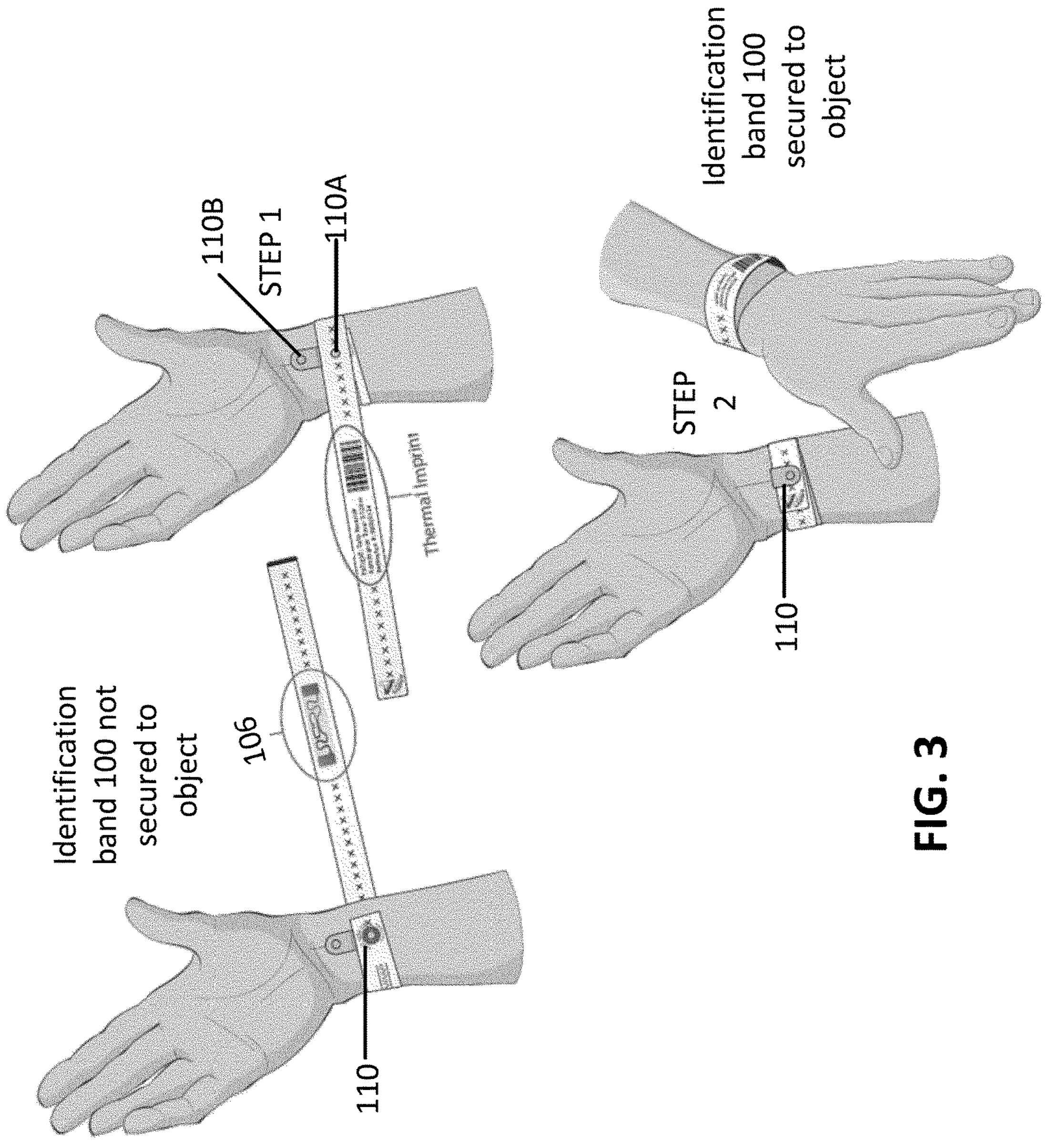
FIG. 3 illustrates the steps for securing the identification band of FIG. 1 to the object to be identified.

In one example, as illustrated in FIG. 3, in Step 1, the identification band 110 is applied by securing the first elongated strip portion 108 completely around an object to be identified (i.e., a human wrist) via one and only one fastener 110 (i.e., a snap fastener having a male portion 110A and a female portion 110B). In particular, the male portion 110A of the one and only one fastener 110 is inserted in the pin receiver 116 at a lower surface of the strip of material 103 such that the first elongated strip portion 108 defines the first loop A around the object. In Step 2, the second elongated strip portion 112 is secured around the object to the first elongated strip portion 108 via the one and only one fastener 110. In particular, the male portion 110A is inserted in the pin receiver 118 at a lower surface of the strip of material 103 and received by the female portion 110B at an upper surface of the strip of material 103 such that the first elongated strip portion 108, the transponder supporting portion 104, and the second elongated strip portion 112 together define the second loop B at least partly around the object. The pin receivers 116, 118 are identified by an “x” in FIG. 3. A diameter of the second loop B is greater than a diameter of the first loop A such that an air gap 120 exists between the transponder supporting portion 104 and an outer surface of the first loop A. See FIG. 2.

Figure 7:
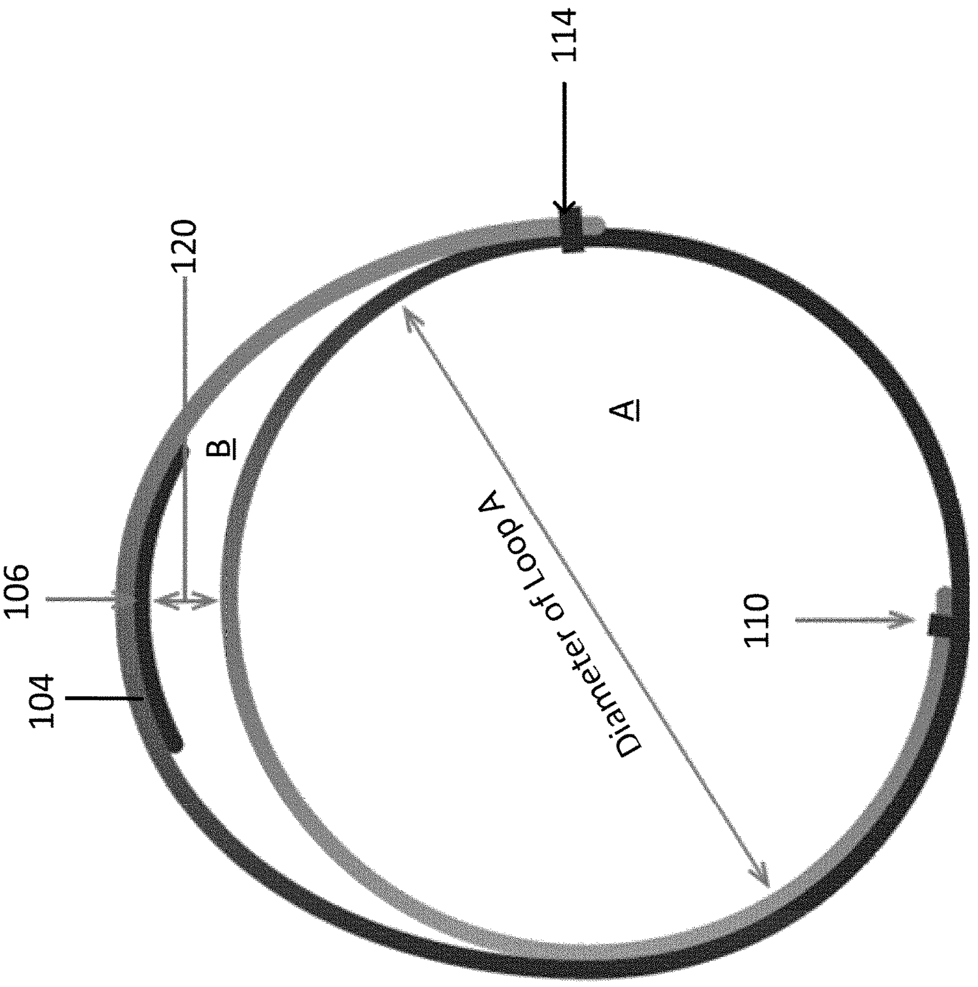
FIG. 7 illustrates an example of the identification band of FIG. 4, where a first loop and a second loop are formed by securing portions of the identification band with a first snap fastener or first securing pin and a second snap fastener or second securing pin.
Figure 8:
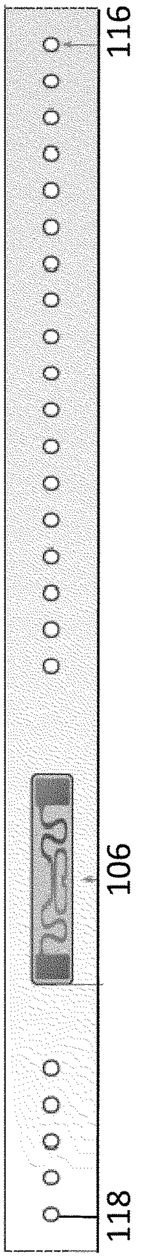
FIG. 8 illustrates the identification band of FIG. 4, further including a plurality of pin receivers.
Figure 10:
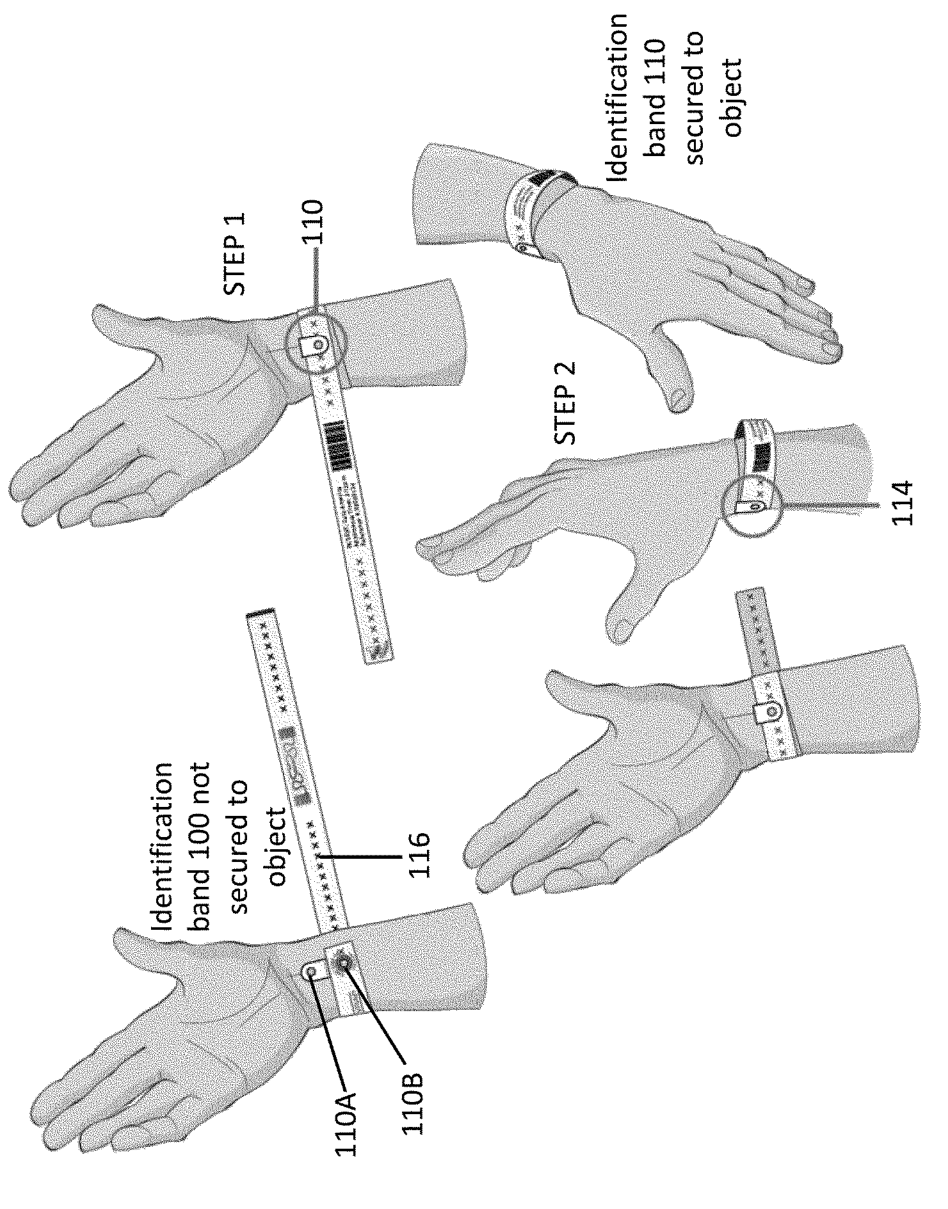
FIG. 10 illustrates the steps for securing the identification band of FIG. 7 to the object to be identified.

In another example, as illustrated in FIG. 10, in Step 1, the identification band 110 is applied by securing the first elongated strip portion 108 completely around an object to be identified (i.e., a human wrist) via the first fastener 110 (i.e., a snap fastener having a male portion 110A and a female portion 110B). In particular, the male portion 110A of the first fastener 110 is inserted in the pin receiver 116 at one of an upper or a lower surface of the strip of material 103 and received by the female portion 110B of the first fastener 110 at the other of the upper or the lower surface of the strip of material 103 such that the first elongated strip portion 108 defines the first loop A around the object. In Step 2, the second elongated strip portion 112 is secured around the object to the first elongated strip portion 108 via the second fastener 114 (i.e., a snap fastener having a male portion 114A and a female portion 114B). In particular, the male portion 114A of the second fastener 114 is inserted in the pin receiver 118 at one of the upper or the lower surface of the strip of material 103 and received by the female portion 114B of the second fastener 114 at the other of the upper or the lower surface of the strip of material 103 such that the first elongated strip portion 108, the transponder supporting portion 104, and the second elongated strip portion 112 together define the second loop B at least partly around the object. The pin receivers 116, 118 are identified by an "x" in FIG. 10. A diameter of the second loop B is greater than a diameter of the first loop A such that an air gap 120 exists between the transponder supporting portion 104 and an outer surface of the first loop A. See FIG. 7.

In one example, at least one pin receiver 116 is provided in the first elongated strip portion 108, at least one pin receiver 118 is provided in the second elongated strip portion 112. In some implementations, one and only one fastener 110, in particular, a securing pin, is configured to be received in the at least one pin receiver 116 of the first elongated strip portion 108 and the at least one pin receiver 118 of the second elongated strip portion 112 via friction fit. In other implementations, a first fastener 110 and a second fastener 114 are securing pins. The first fastener 110 is configured to be received in the at least one pin receiver 116 of the first elongated strip portion 108 via friction fit. The second fastener 114 is configured to be received in the at least one pin receiver 118 of the second elongated strip portion 112 via friction fit. These implementations do not include a female portion configured to receive the securing pin. The at least one pin receiver 116 and the at least one pin receiver 118 may be, for example, an aperture or hole in the strip of material 103.

In any of the examples described above in which the fastener 110, 114 includes a male portion or a securing pin, a first plurality of pin receivers 116 may provided in the first elongated strip portion 108. Each of the first plurality of pin receivers 116 are spaced apart and arranged in a line. A second plurality of pin receivers 118 may provided in the second elongated strip portion 112. Each of the second plurality of pin receivers 118 are spaced apart and arranged in a line. The first plurality of pin receivers 116 and the second plurality of pin receivers 118 may be, for example, an aperture or hole in the strip of material 103.

Figure 11:
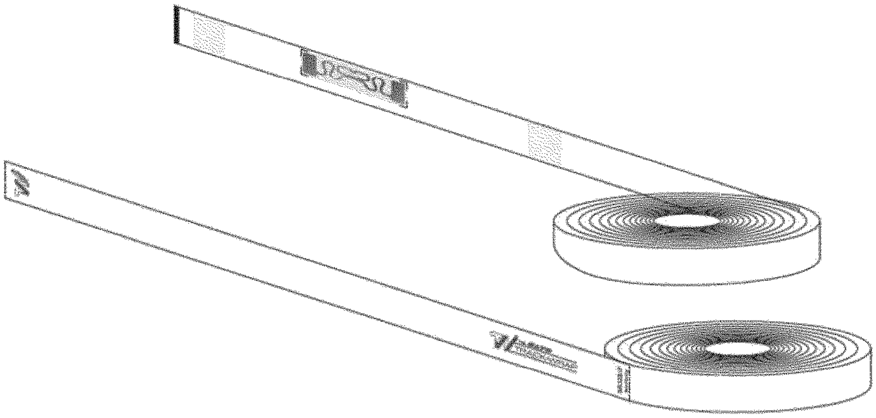
FIG. 11 illustrates a plurality of identification bands wound, end-to-end, on a roll.

In some examples, a plurality of strips of material 103 may be arranged, end-to-end, as a continuous medium on a roll. See FIG. 11. The continuous medium may be used as a printer medium used in printers make identification bands having information indicia printed upon an external surface thereof. The continuous medium may include tear lines or perforated lines defining end edges of each individual strip of material 103. In examples in which a plurality of strips of material 103 are arranged as a continuous medium on a roll for use as a printing medium, printing of information on an external surface of a strip or strips of material 103 may be performed before, after, or during communication with the transponder 106. The transceiver 200 may be provided in a printer 300 (see FIG. 13) or may be independent from and exterior to the printer 300 (i.e., the printer is provided at a distance from the transceiver 200) (see FIG. 14).

Due to the increased read distance between the transponder of the identification band 100 and the transceiver 200, a monitoring system including the identification band 100 and at least one transceiver 200 may be used to unobtrusively monitor patients, customers, patrons, etc. For example, a plurality of transceivers 200 (e.g., RFID readers) may be placed in a plurality of locations such as doorways, hallways, etc. within an area to be monitored.

The construction and arrangements of the identification band, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention. Features of one embodiment may be combined with a feature of another embodiment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise form provided. Accordingly, these terms should be interpreted as indicating that insubstantial or inconsequential modifications or alterations of the subject matter described and claimed are considered to be within the scope of the invention.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. An identification band comprising:

a strip of material including a first elongated strip portion at one end of the strip, a second elongated strip portion at an other end of the strip, and a transponder supporting portion provided between the first elongated strip portion and the second elongated strip portion;

a transponder provided in the transponder supporting portion; and at least one fastener, wherein the first elongated strip portion is sized and configured to be secured completely around an object to be identified via the at least one fastener such that the first elongated strip portion defines a first loop around the object;

the second elongated strip portion is sized and configured to be secured via the at least one fastener such that the first elongated strip portion, the transponder supporting portion, and the second elongated strip portion together define a second loop at least partly around the object, and a diameter of the second loop is greater than a diameter of the first loop such that an air gap exists between the transponder supporting portion and an outer surface of the first loop.

2. The identification band of claim 1, wherein the at least one fastener comprises an adhesive layer.

3. The identification band of claim 1, wherein the at least one fastener comprises a snap fastener having a male portion configured to be received in a female portion.

4. The identification band of claim 3, wherein the male portion is provided at a proximal end of a fastening material and the female portion is provided at a distal end of the fastening material.

5. The identification band of claim 1, wherein the at least one fastener comprises a securing pin configured to be received in at least one of a plurality of pin receivers provided in the strip of material, the plurality of pin receivers being spaced apart and arranged in a line.

6. The identification band of claim 1, wherein the at least one fastener comprises a securing pin configured to be received in a first pin receiver provided in the first elongated strip portion and a second pin receiver provided in the second elongated strip portion.

7. The identification band of claim 1, wherein the at least one fastener comprises one and only one fastener.

8. The identification band of claim 7, wherein the one and only one fastener comprises a snap fastener having a male portion configured to be received in a female portion, at least one pin receiver is provided in the first elongated strip portion, at least one pin receiver is provided in the second elongated strip portion, and the male portion of the one and only one fastener comprises a securing pin received in the at least one pin receiver of the first elongated strip portion and the at least one pin receiver of the second elongated strip portion prior to being received in the female portion of the one and only one fastener.

9. The identification band of claim 1, wherein the at least one fastener comprises a first fastener and a second fastener.

10. The identification band of claim 9, wherein the first fastener comprises a first adhesive layer, the second fastener comprises a second adhesive layer, the first elongated strip portion is sized and configured to be secured completely around the object to be identified via the first adhesive layer such that the first elongated strip portion defines the first loop around the object;

the second elongated strip portion is sized and configured to be secured via the second adhesive layer such that the first elongated strip portion, the transponder supporting portion, and the second elongated strip portion together define the second loop at least partly around the object.

11. The identification band of claim 9, wherein at least one pin receiver is provided in the first elongated strip portion, at least one pin receiver is provided in the second elongated strip portion, the first fastener comprises a first snap fastener having a first male portion configured to be received in a first female portion, the first male portion comprising a first securing pin received in the at least one pin receiver provided in the first elongated strip portion prior to being received in the first female portion, and the second fastener comprises a second snap fastener having a second male portion configured to be received in a second female portion, the second male portion comprising a second securing pin received in the at least one pin receiver provided in the second elongated strip portion prior to being received in the second female portion.

12. The identification band of claim 1, wherein the transponder is mounted on a surface of the strip of material.

13. The identification band of claim 1, wherein the transponder is embedded within the strip of material.

14. The identification band of claim 1, wherein the strip of material is a continuous printer medium wound on a roll.

15. The identification band of claim 1, wherein the strip of material comprises a thermal imprintable material, such that a direct thermal printer or a thermal transfer printer is capable of printing upon an external surface of the strip of material.

16. The identification band of claim 1, wherein the strip of material comprises a plastic material or a paper material.

17. The identification band of claim 1, wherein the strip of material comprises at least one material configured to allow a printer to print on an exterior surface of the strip of material.

18. The identification band of claim 1, wherein the air gap between the transponder supporting portion and the outer surface of the first loop is approximately 0.25 inches to 1 inch at a maximum distance between the transponder supporting portion and the outer surface of the first loop.

19. A system for identifying an object, the system comprising:

the identification band of claim 1; and a transceiver configured to read data from the transponder of the identification band, write data to the transponder of the identification band, or a combination thereof.

20. A method of applying an identification band comprising a strip of material including a first elongated strip portion at one end of the strip, a second elongated strip portion at an other end of the strip, and a transponder supporting portion provided between the first elongated strip portion and the second elongated strip portion; a transponder provided in the transponder supporting portion; and at least one fastener, the method comprising:

securing the first elongated strip portion completely around an object to be identified via the at least one fastener such that the first elongated strip portion defines a first loop around the object; and securing the second elongated strip portion around the object to the first elongated strip portion via the at least one fastener such that the first elongated strip portion, the transponder supporting portion, and the second elongated strip portion together define a second loop at least partly around the object, wherein a diameter of the second loop is greater than a diameter of the first loop such that an air gap exists between the transponder supporting portion and an outer surface of the first loop.

* * * * *